Feb. 21, 1956 T. S. McLEOD 2,735,983
ELECTRIC FREQUENCY MODULATING CIRCUITS
Filed Feb. 13, 1952
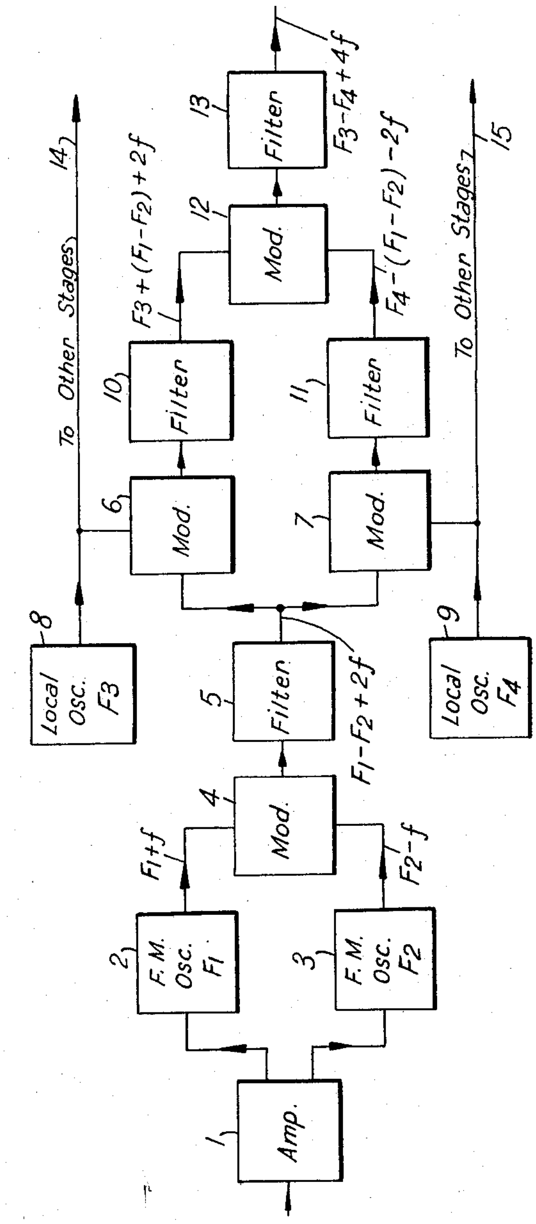
Inventor
T.S. MCLEOD
By Philip M. Bolton
Attorney United States Patent Office 2,735,983

Patented Feb. 21, 1956

2,735,983

ELECTRIC FREQUENCY MODULATING CIRCUITS

Thomas Symington McLeod, London, England, assignor to International Standard Electric Corporation, New York, N. Y., a corporation of Delaware Application February 13, 1952, Serial No. 271,340

Claims priority, application Great Britain February 15, 1951

4 Claims. (Cl. 332—22)

The present invention relates to electric frequency modulation systems.

In frequency modulation systems it often happens that on account of the non-linear characteristics of frequency modulating circuits, the initial frequency deviation which may be permitted without introducing excessive distortion is too small for direct transmission if the signal-to-noise ratio requirements are to be fulfilled. For this reason it has been customary to pass the carrier wave after initial frequency modulation through a series of frequency multipliers by means of which the frequency deviation is multiplied up to a suitable value. However, since a frequency multiplier generally consists of a circuit in which a number of harmonics of the input frequency are produced, followed by some means for selecting a given harmonic, the mean frequency of the modulated carrier wave will be multiplied by the same factor as the deviation, so that it may become inconveniently large before sufficient deviation has been produced.

The object of the present invention therefore, is to overcome this difficulty by means of a circuit not containing any frequency multipliers of the usual type.

This object is achieved according to the invention by providing an electric frequency modulation system comprising means for generating a frequency modulated carrier wave having a given mean frequency, a frequency changing circuit, and means for supplying the said carrier wave thereto, the said frequency changing circuit including a plurality of frequency-changing modulator circuits arranged in such manner that the ratio of the frequency deviation of the output carrier wave to that of the input carrier wave is greater than 1, and that the corresponding ratio of the mean carrier frequencies is less than the first-mentioned ratio.

The figure of the accompanying drawing shows a block schematic circuit diagram of a frequency modulation system according to the invention. In this system, the modulating signal wave is applied through an amplifier 1 to modulate the frequencies of two similar high frequency oscillators 2, 3 of any convenient type, the corresponding mean frequencies being $F_1$ and $F_2$. The signal wave should be applied to modulate the frequencies $F_1$ and $F_2$ in opposite senses, and preferably by equal amounts, and for this purpose the amplifier 1 may conveniently be provided with two outputs in opposite phase derived from a push-pull stage. Let $f$ be the frequency deviation of each oscillation, then the output frequencies from oscillators 2 and 3 will be respectively $F_1+f$ and $F_2-f$.

These frequencies are supplied to a frequency-changing modulator 4 of conventional type, and a filter 5 selects the lower sideband frequency $F_1-F_2+2f$. The selected sideband is supplied to two further frequency-changing modulators 6 and 7, respectively supplied with high frequency heterodyne waves from local oscillators 8 and 9 of any convenient type, generating fixed frequencies $F_3$ and $F_4$. Filters 10 and 11 respectively select the upper and lower sideband frequencies F $F_3+(F_1-F_2)+2f$ and $F_4-(F_1-F_2)-2f$ from the modulators 6 and 7. These sideband frequencies are supplied to a further frequency-changing modulator 12, and from this the lower sideband of frequency $F_3-F_4+4f$ is selected by the filter 13. The output mean frequency is thus equal to the difference between the frequencies chosen for the local oscillators.

Thus it will be seen that the original deviation $f$ is multipled by 4, and the frequencies $F_3$ and $F_4$ may be chosen in any desired manner, for example, they may be chosen so that $F_3-F_4$ is equal to the mean frequency desired for the finally transmitter carrier wave.

It will be evident that any number of further multiplying stages (not shown), each comprising a duplicate set of the elements 6, 7, and 10 to 13, may be supplied, and each will multiply the deviation by 2. The oscillators 8 and 9 may be used as local oscillators for all the extra stages, which may be connected to the conductors 14 and 15; or if desired, separate oscillators (not shown) giving frequencies different from $F_3$ and $F_4$ may be used. If the oscillators 8 and 9 are used, it will be seen that the mean output frequency from each stage will be the same, namely $F_3-F_4$. In other words, each additional stage will multiply the deviation by 2, but no further change in the mean frequency will be produced.

Obviously, by suitable choice of the local oscillator frequencies of the various stages, the mean output frequency should be increased or decreased every time the deviation is multiplied by 2. However, according to the invention, in at least one of the multiplying stages, the ratio of the output deviation to the input deviation should be greater than the ratio of the corresponding mean frequencies.

While the principles of the invention have been described above in connection with specific embodiments, and particular modifications thereof, it is to be clearly understood that this description is made only by way of example and not as a limitation on the scope of the invention.

What I claim is:

1. An electric frequency modulation system comprising means for generating a frequency modulated carrier wave having a given mean frequency, a frequency changing circuit including first and second frequency-changing modulator circuits, means for supplying said carrier wave to each of said modulators, the outputs from said modulators having a predetermined relationship, means for applying said outputs to a third modulator, the output thereof being such that the ratio of the frequency deviation of the output carrier wave to that of the input carrier wave is greater than 1, and that the corresponding ratio of the mean carrier frequencies is less than the first mentioned ratio.

2. An electric frequency modulation system comprising means for generating a frequency modulated carrier wave having a given mean frequency, first and second frequency-changing modulators, two local oscillators supplying heterodyne waves of different fixed frequencies respectively to the said modulators, means for supplying the said carrier wave to each of the said modulators, means for selecting the upper sideband frequency from one modulator, and the lower sideband frequency from the other modulator, means for supplying both selected sideband frequencies to a third frequency-changing modulator, and means for selecting the lower sideband from the third modulator, the said fixed frequencies being so chosen that the ratio of the frequency deviation of the last mentioned sideband to that of the said carrier wave is greater than the ratio of the corresponding mean frequencies.

3. A system according to claim 2 in which the means for generating the frequency modulated carrier wave comprises two primary oscillators arranged to generate waves of different mean frequencies, means for applying a signal wave to modulate the frequencies of the waves generated by both the primary oscillators in such manner that the frequency deviations are respectively in opposite senses, means for supplying the frequency modulated waves from both oscillators to a frequency-changing modulator coupled in said circuit before said first and second modulators with respect to said applied signal wave, and means for selecting the lower sideband frequency from the last-mentioned modulator.

4. A system according to claim 3 in which the said frequency deviations are arranged to be substantially equal in magnitude.

References Cited in the file of this patent

UNITED STATES PATENTS

| | | |
|---|---|---|
| 2,523,222 | Marks | Sept. 19, 1950 |
| 2,526,347 | Golladay | Oct. 17, 1950 |
| 2,572,958 | Spacek | Oct. 30, 1951 |